(12) United States Patent
McCarthy, Jr.

(10) Patent No.: US 7,685,813 B2
(45) Date of Patent: Mar. 30, 2010

(54) LNT REGENERATION STRATEGY OVER NORMAL TRUCK DRIVING CYCLE

(75) Inventor: James Edward McCarthy, Jr., Canton, MI (US)

(73) Assignee: Eaton Corporation, Cleveland, OH (US)

( * ) Notice: Subject to any disclaimer, the term of this patent is extended or adjusted under 35 U.S.C. 154(b) by 449 days.

(21) Appl. No.: 11/148,637

(22) Filed: Jun. 9, 2005

(65) Prior Publication Data

US 2006/0277898 A1  Dec. 14, 2006

(51) Int. Cl.
*F01N 3/00* (2006.01)

(52) U.S. Cl. .............................. 60/295; 60/274; 60/297; 60/301

(58) Field of Classification Search ............. 60/274, 60/285, 286, 295, 301, 303
See application file for complete search history.

(56) References Cited

U.S. PATENT DOCUMENTS

| | | | | |
|---|---|---|---|---|
| 5,035,188 | A * | 7/1991 | Johnson et al. | 110/345 |
| 5,402,641 | A * | 4/1995 | Katoh et al. | 60/285 |
| 5,437,153 | A * | 8/1995 | Takeshima et al. | 60/276 |
| 6,021,638 | A | 2/2000 | Hochmuth | |
| 6,109,024 | A * | 8/2000 | Kinugasa et al. | 60/285 |
| 6,128,899 | A | 10/2000 | Oono et al. | |
| 6,233,925 | B1 | 5/2001 | Hirota et al. | |
| 6,370,868 | B1 * | 4/2002 | Kolmanovsky et al. | 60/274 |
| 6,467,258 | B1 | 10/2002 | Jobson et al. | |
| 6,477,832 | B1 * | 11/2002 | Surnilla et al. | 60/285 |
| 6,571,551 | B2 | 6/2003 | Lundgren et al. | |
| 6,574,955 | B2 | 6/2003 | Schroder et al. | |
| 6,637,198 | B2 | 10/2003 | Hertberg | |
| 6,694,724 | B2 | 2/2004 | Tanaka et al. | |
| 6,718,757 | B2 | 4/2004 | Khair et al. | |
| 6,732,507 | B1 | 5/2004 | Stanglmaier et al. | |
| 6,742,328 | B2 | 6/2004 | Webb et al. | |
| 6,820,417 | B2 | 11/2004 | May et al. | |
| 6,823,664 | B2 | 11/2004 | Nakatani et al. | |
| 6,857,421 | B2 | 2/2005 | Adler et al. | |
| 6,865,883 | B2 | 3/2005 | Gomulka | |
| 6,976,356 | B2 * | 12/2005 | Okada et al. | 60/286 |
| 7,101,531 | B2 * | 9/2006 | Kamijo | 423/650 |
| 7,251,930 | B2 | 8/2007 | Audouin | |
| 2002/0092297 | A1 | 7/2002 | Hertzberg | |
| 2003/0033800 | A1 | 2/2003 | Tonetti et al. | |
| 2003/0074893 | A1 | 4/2003 | Webb et al. | |
| 2003/0089103 | A1 | 5/2003 | Hahn et al. | |
| 2003/0115858 | A1 | 6/2003 | Hahn et al. | |
| 2003/0145579 | A1 | 8/2003 | Surnilla | |

(Continued)

*Primary Examiner*—Thomas E Denion
*Assistant Examiner*—Diem Tran
(74) *Attorney, Agent, or Firm*—Paul V. Keller (57) ABSTRACT

Partial denitrations are made practical by an SCR catalyst placed downstream of a NOx adsorber. The SCR catalyst permits partial denitrations to be extended to where a favorable fuel penalty rate presented by driving conditions can be utilized to a sufficient extent that the benefit of the favorable conditions is not offset by the increased start-up fuel penalty associated with conducting opportunistic partial denitrations. Regenerations, including both denitration and desulfations, can be initiated selectively based on a fuel penalty calculation. Examples of such calculations lead to methods in which opportunistic regenerations are based on low oxygen concentrations, condition existing while shifting gears, and throttling events for a diesel engine with a throttled air supply. The methods flexibly take advantage of driving conditions to reduce fuel penalties associated with regenerations. In one embodiment, driving conditions include future conditions predicted based on GPS and map data.

20 Claims, 3 Drawing Sheets

U.S. PATENT DOCUMENTS

| | | |
|---|---|---|
| 2004/0050037 A1 | 3/2004 | Betta et al. |
| 2004/0076565 A1 | 4/2004 | Gandhi et al. |
| 2004/0115111 A1 | 6/2004 | Twigg |
| 2004/0123585 A1 | 7/2004 | Yamaguchi et al. |
| 2004/0139730 A1 | 7/2004 | Taylor, III et al. |
| 2004/0166043 A1 * | 8/2004 | Vandine et al. .......... 423/245.1 |
| 2005/0022511 A1 | 2/2005 | Miura |

* cited by examiner

LNT REGENERATION STRATEGY OVER NORMAL TRUCK DRIVING CYCLE

FIELD OF THE INVENTION

The present invention relates to pollution control devices for diesel engines.

BACKGROUND OF THE INVENTION $NO_x$ emissions from diesel engines are an environmental problem. Several countries, including the United States, have long had regulations pending that will limit $NO_x$ emissions from trucks and other diesel-powered vehicles. Manufacturers and researchers have already put considerable effort toward meeting those regulations.

In gasoline powered vehicles that use stoichiometric fuel-air mixtures, three-way catalysts have been shown to control $NO_x$ emissions. In diesel-powered vehicles, which use compression ignition, the exhaust is generally too oxygen-rich for three-way catalysts to be effective.

Several solutions have been proposed for controlling NOx emissions from diesel-powered vehicles. One set of approaches focuses on the engine. Techniques such as exhaust gas recirculation and partially homogenizing fuel-air mixtures are helpful, but these techniques alone will not eliminate NOx emissions. Another set of approaches remove NOx from the vehicle exhaust. These include the use of lean-burn $NO_x$ catalysts, selective catalytic reduction (SCR), and lean $NO_x$ traps (LNTs).

Lean-burn NOx catalysts promote the reduction of $NO_x$ under oxygen-rich conditions. Reduction of NOx in an oxidizing atmosphere is difficult. It has proved challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. Lean-burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiencies for lean-burn catalysts are unacceptably low.

SCR refers to selective catalytic reduction of NOx by ammonia. The reaction takes place even in an oxidizing environment. The NOx can be temporarily stored in an adsorbant or ammonia can be fed continuously into the exhaust. SCR can achieve high levels of NOx reduction, but there is a disadvantage in the lack of infrastructure for distributing ammonia or a suitable precursor. Another concern relates to the possible release of ammonia into the environment.

LNTs are NOx adsorbers combined with catalysts for NOx reduction. The adsorbant is typically an alkaline earth oxide adsorbant, such as $BaCO_3$ and the catalyst is typically a precious metal, such as Pt or Ru. In lean exhaust, the catalyst speeds oxidizing reactions that lead to NOx adsorption. Accumulated NOx is removed by creating a rich environment within the LNT through the introduction of a reductant. In a rich environment, the catalyst activates reactions by which adsorbed NOx is reduced and desorbed, preferably as $N_2$. The process of removing accumulated NOx from the LNT is commonly referred to as regeneration, although it may also be referred to as denitration in order to distinguish desulfation, described below.

In addition to accumulating NOx, LNTs accumulate SOx. SOx is the combustion product of sulfur present in ordinarily diesel fuel. Even with reduced sulfur fuels, the amount of SOx produced by diesel combustion is significant. SOx adsorbs more strongly than NOx and necessitates a more stringent, though less frequent, regeneration. Desulfation requires elevated temperatures as well as a reducing atmosphere.

The conditions for denitration may be created in several ways. One approach uses the engine to create a rich fuel-air mixture. This may be accomplished, for example, by injecting extra diesel fuel into one or more engine cylinders after combustion and substantial decompression. Reductant may also be injected into the exhaust downstream of the engine. In either case, a portion of the reductant must be expended to consume oxygen in the exhaust. The reductant can consume oxygen either by reactions in the LNT or by reactions in an upstream unit. For example, U.S. Patent Pub. No. 2004/0050037 describes an exhaust system with a fuel reformer placed inline with the exhaust and upstream of an LNT. The fuel reformer not only consumes excess oxygen, but converts diesel fuel into more reactive reformate. There is a significant fuel penalty, regardless of which approach is used.

Many publications propose reducing the fuel penalty by providing two or more LNTs in a parallel arrangement. During regeneration of an LNT, all or part of the exhaust flow can be diverted to the other LNTs. The implementation of this method requires the use of at least one exhaust valve that for a heavy duty truck must generally fit an exhaust pipe with an inner diameter of at least about 10 cm. U.S. Pat. No. 6,820,417 describes a four-way valve for this purpose. U.S. Patent Pub. No. 2004/0139730 describes a valve that divides reductant and exhaust between two LNTs. In a first position the valve directs reductant to one LNT and exhaust to the other and in a second position switches the flows. The durability and reliability of these valves is not known, although experience with smaller EGR valves suggest durability and reliability will present challenges for these valves.

In certain applications that employ LNTs, as in lean-burn gasoline engines, stoichiometric air-fuel ratios occur during normal operation. It is known to preferentially carry out denitration when such favorable conditions occur during normal vehicle operation. For example, U.S. Patent Pub. No. 2003/0115858, teaches preferentially regenerating an LNT when engine power demand is high, and U.S. Patent Pub. No. 2003/0089103 teaches avoiding regeneration when an engine is at idle.

It is also known that regeneration, especially desulfation, can be carried out more efficiently if initiated while an LNT is relatively hot. U.S. Pat. No. 6,128,899 teaches regenerating a LNT just before fuel cut-off events to avoid having to regenerate the LNT after it becomes cold. U.S. Pat. No. 6,637,198 teaches carrying out partial desulfation when an LNT is at a critical temperature as a result of a normal driving cycle.

U.S. Pat. No. 6,742,328, suggests reducing the fuel penalty for regenerating a LNT in an exhaust treatment system of a compression ignition diesel engine by performing partial regenerations during deceleration to take advantage of low flow conditions.

U.S. Pat. No. 6,732,507 and U.S. Patent Pub. No. 2004/0076565 suggest improving the efficiency of an LNT by combining it with a downstream SCR catalyst in series. The SCR catalyst captures ammonia produced by the LNT toward the end of a complete LNT regeneration cycle. The SCR catalyst subsequently uses the captured ammonia to convert NOx bypassing the LNT and thereby increases the overall extent of NOx conversion.

In spite of advances, there continues to be a long felt need for an affordable and reliable exhaust treatment system that is durable, has a manageable operating cost (including fuel penalty), and can practically be used to reduce NOx emissions across the spectrum of diesel engines to a satisfactory extent in the sense of meeting U.S. Environmental Protection Agency (EPA) regulations effective in 2010 and other such regulations.

SUMMARY OF THE INVENTION

One of the inventor's concepts relates to a method of operating a NOx adsorber treating exhaust from a compression ignition diesel engine. The method involves calculating a fuel penalty or fuel penalty rate associated with incremental, partial, or full denitration or desulfation of the NOx adsorber under current and/or predicted conditions and initiating a partial or full denitration or desulfation processes based selectively on whether the calculated fuel penalty is sufficiently low. The method flexibly takes advantage of driving conditions to reduce the fuel penalty associated with regeneration. The method can take into account a start-up cost to begin a regeneration as well as incremental costs that depend on the extent of regeneration. In a preferred embodiment, the method updates the fuel penalty calculation during regeneration and can terminate the regeneration when conditions change such that continuing regeneration would be inefficient. In another preferred embodiment, the method predicts future conditions, for example by using GPS and map data to predict such conditions as uphill driving, downhill driving, and frequent traffic stops.

A related concept is a method of operating a NOx adsorber that involves determining the oxygen concentration in the exhaust and initiating a partial or full denitration or desulfation processes based selectively on the oxygen concentration. Oxygen concentration is an indicator of fuel penalty in many systems. This is particularly true for throttled diesel engines, wherein conditions such as idle have both low oxygen concentration and low flow rate.

Another of the inventor's concepts is a method of operating a NOx adsorber that involves selectively carrying out full or partial denitrations during gear shifts. Fuel penalty calculations and experimental data from a throttled diesel engine show that low oxygen concentrations and low flow rates suitable for denitraton occur in some systems when the engine is between gears.

A further concept of the inventor is a method of operating a NOx adsorber treating the exhaust of a compression ignition diesel engine having a throttled air supply. The method involves selectively carrying out partial or full denitrations or desulations when the air supply is throttled to an elevated degree in response to driving conditions. A significant improvement in fuel economy may be realized by this method.

A still further concept of the inventor is that partial denitrations are much more effective in reducing fuel penalty if an SCR catalyst is placed downstream of the NOx adsorber. In the absence of an SCR catalyst, denitration ceases to be fuel efficient once ammonia production becomes significant. This forces early termination of the partial denitration cycle, often before the benefit of favorable conditions can be realized to an extent that offsets the increased start-up fuel penalties that partial denitrations entail. Adding an SCR catalyst permits partial denitration to be extended, whereby it becomes much more realistic to consistently find conditions where a significant fuel penalty benefit can be achieved by carrying out opportunistic partial denitrations.

The primary purpose of this summary has been to present certain elements of the inventor's concepts in a simplified form to facilitate understanding of the more detailed description that follows. This summary is not a comprehensive description of every one of the inventor's concepts or every combination of the inventor's concepts that can be considered "invention". Other concepts of the inventor will become apparent to one of ordinary skill in the art from the following detailed description and annexed drawings. The concepts disclosed herein may be generalized, narrowed, or combined in various ways with the ultimate statement of what the inventor claims as his invention being reserved for the claims that follow.

DETAILED DESCRIPTION OF THE INVENTION

Figure 1:
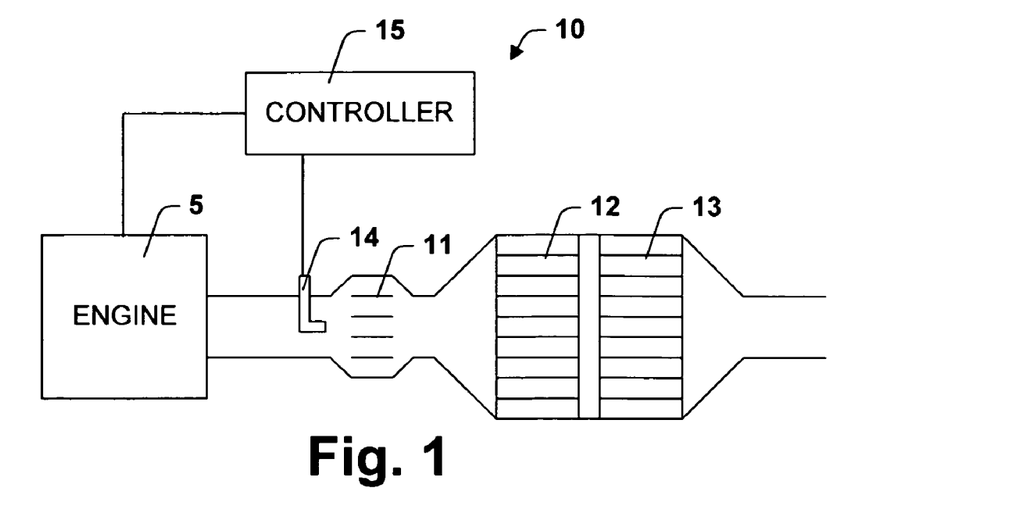
FIG. 1 is a schematic illustration of an exemplary system to which various concepts of the inventor can be applied.

FIG. 1 illustrates an exemplary exhaust treatment system 10 that provides a context for discussing various concepts of the inventor. The exhaust system 10 comprises a fuel reformer 11, a NOx adsorber 12, a SCR catalyst 13, a fuel injector 14, and a controller 15. The exhaust system 10 typically contains further components, such as a diesel particulate filter (DPF) for removing particular matter and sensors for providing information to the controller 15. The exhaust system 10 is configured to treat the exhaust of a compression ignition engine 5. Regeneration of the NOx adsorber 12 can be regulated by the controller 15 through operation of the fuel injector 14. The controller 15 may be an electronic control unit (ECU) that also controls the engine 5 or a separate control unit. The exhaust system 10 becomes a system according to the present invention when the controller 15 implements one of the methods described herein.

The engine 5 is preferably a conventional diesel engine except that the intake air supply is preferably fitted with a throttle valve to reduce air flow to the engine during periods that power demand is low. The engine can be of any suitable size including, for example, a small size suitable size for a passenger car or light duty truck or a large size suitable for a heavy duty truck or bus. The exhaust of the engine 5 generally has an oxygen concentration that ranges from about 5 mol % to at most about 20 mol %.

The engine 5 is also preferably configured for exhaust gas recirculation (EGR). EGR can be either internal or external. When the degree of throttling increases while external EGR is in use, the effective EGR rate can increase substantially. This effect may be mitigated by reducing the degree of EGR valve opening, although the oxygen content of the exhaust is generally decreased by throttling regardless.

An exhaust treatment system can use any suitable reductant. The reductant is either provided through the engine 5 or injected into the exhaust through the fuel injector 14. Where the reductant is diesel fuel, the reductant preferably undergoes reforming prior to reaching the NOx adsorber 12. Reforming can take place in the exhaust stream, in a partial exhaust stream, or outside the exhaust stream. In the example of FIG. 1, reforming takes place in the exhaust stream.

In addition to reducing NOx, the reductant generally consumes excess oxygen in the exhaust. Oxygen can be consumed by an inline reformer 11 or other exhaust system catalyst. Typically, the NOx adsorber 12 will have a catalyst suitable for reaction between the reductant and oxygen to consume excess oxygen, although consuming oxygen in this way often has the disadvantage of causing undesirably high temperatures and temperature gradients in the NOx adsorber 12.

Examples of suitable reductants include CO, $H_2$, $NH_3$, gasoline, diesel fuel, and reformed gasoline or diesel fuel (reformate). In the exhaust treatment system 10, the reductant is diesel fuel injected by the fuel injector 14 and processed through the inline reformer 11 to produce reformate.

A fuel reformer is a device that converts heavier fuels into lighter compounds without fully combusting the fuel. A fuel reformer can be a catalytic reformer, a steam reformer, an autothermal reformer, or a plasma reformer. Preferably, the reformer 11 is a partial oxidation catalytic reformer. A partial oxidation catalytic reformer comprises a reformer catalyst. Examples of reformer catalysts include precious metals, such as Pt, Pd, or Ru, and oxides of Al, Mg, and Ni, that later group being typically combined with one or more of CaO, $K_2O$, and a rare earth metal such as Ce to increase activity. A reformer is preferably small in size as compared to an oxidation catalyst or a three-way catalyst designed to perform its primary functions at temperatures below 500° C.

The NOx adsorber 12 can comprise any suitable NOx-adsorbing material. NOx includes NO and $NO_2$. Examples of adsorbant materials include molecular sieves, such as zeolites, alumina, silica, and activated carbon. Further examples are oxides, carbonates, and hydroxides of alkaline earth metals such as Mg, Ca, Sr, and Be or alkali metals such as K or Ce. Still further examples include metal phosphates, such as phoshates of titanium and zirconium.

Molecular seives are materials having a crystalline structure that defines internal cavities and interconnecting pores of regular size. Zeolites are the most common example. Zeolites have crystalline structures generally based on atoms tetrahedrally bonded to each other with oxygen bridges. The atoms are most commonly aluminum and silicon (giving aluminosilicates), but P, Ga, Ge, B, Be, and other atoms can also make up the tetrahedral framework. The properties of a zeolite may be modified by ion exchange, for example with a rare earth metal or chromium. Preferred zeolites generally include rare earth zeolites and Thomsonite. Rare earth zeolites are zeolites that have been extensively (i.e., at least about 50%) or fully ion exchanged with a rare earth metal, such as lanthanum. For LNTs generally, a preferred adsorbant is an alkaline metal or an alkaline earth metal oxide loaded with a precious metal.

An adsorbant is typically combined with a binder and either formed into a self-supporting structure or applied as a coating over an inert substrate. A binder can be, for example, a clay, a silicate, or a cement. Portland cement can be used to bind zeolite crystals. Generally, the adsorbant is most effective when a minimum of binder is used. For a zeolite adsorbant, preferably the adsorbant bed contains from about 3 to about 20% binder, more preferably from about 3 to about 12%, most preferably from about 3 to about 8%.

Adsorbant and catalysts according to the present invention are generally adapted for use in vehicle exhaust systems. Vehicle exhaust systems create restriction on weight, dimensions, and durability. For example, a NOx adsorbant bed for a vehicle exhaust systems must be reasonably resistant to degradation under the vibrations encountered during vehicle operation.

An adsorbant bed or catalyst brick can have any suitable structure. Examples of suitable structures may include monoliths, packed beds, and layered screening. A packed bed is preferably formed into a cohesive mass by sintering the particles or adhering them with a binder. When the bed has an adsorbant function, preferably any thick walls, large particles, or thick coatings have a macro-porous structure facilitating access to micro-pores where adsorption occurs. A macro-porous structure can be developed by forming the walls, particles, or coatings from small particles of adsorbant sintered together or held together with a binder.

The NOx adsorber 12 preferably comprises a catalyst for the reduction of NOx in a reducing environment. A NOx adsorbant combined with such a catalyst may be referred to as a NOx adsorber-catalyst. The catalyst can be, for example, one or more precious metals, such as Au, Ag, and Cu, group VIII metals, such as Pt, Pd, Ru, Ni, and Co, Cr, Mo, or K. A typical catalyst includes Pt and Rh, although it may be desirable to reduce or eliminate the Rh to favor the production of $NH_3$ over $N_2$. Effective operating temperatures are generally in the range from about 200 to about 450° C.

The SCR catalyst 13 is a catalyst effective to catalyze reactions between NOx and $NH_3$ to reduce NOx to $N_2$ in lean exhaust. Examples of SCR catalysts include oxides of metals such as Cu, Zn, V, Cr, Al, Ti, Mn, Co, Fe, Ni, Pd, Pt, Rh, Rd, Mo, W, and Ce, zeolites, such as ZSM-5 or ZSM-11, substituted with metal ions such as cations of Cu, Co, Ag, Zn, or Pt, and activated carbon. Reaction can be obtained at relatively low temperatures, for example, temperatures in the range from about 230 to about 450° C. The SCR catalyst 13 is carried by a separate brick (support) downstream of the NOx adsorber 12, although optionally the NOx adsorbant 12 and the SCR catalyst 13 are provided on a single substrate. The NOx adsorbant 12 and the SCR catalyst 13 are optionally mixed, layered, or provided in alternating bricks.

Figure 2:
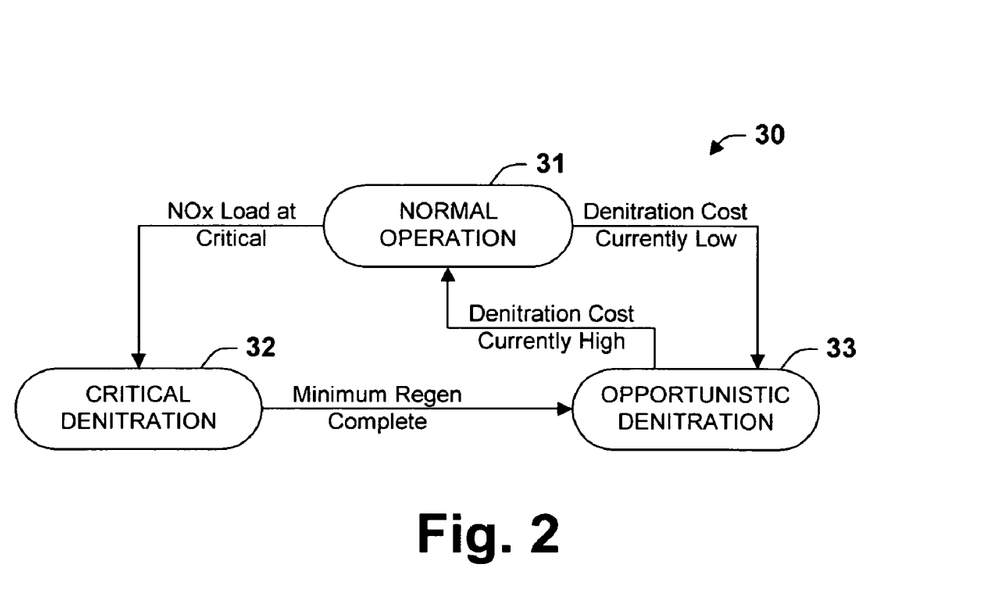
FIG. 2 is a finite state machine diagram illustrating an exemplary control strategy as conceived by the inventor.
Figure 3:
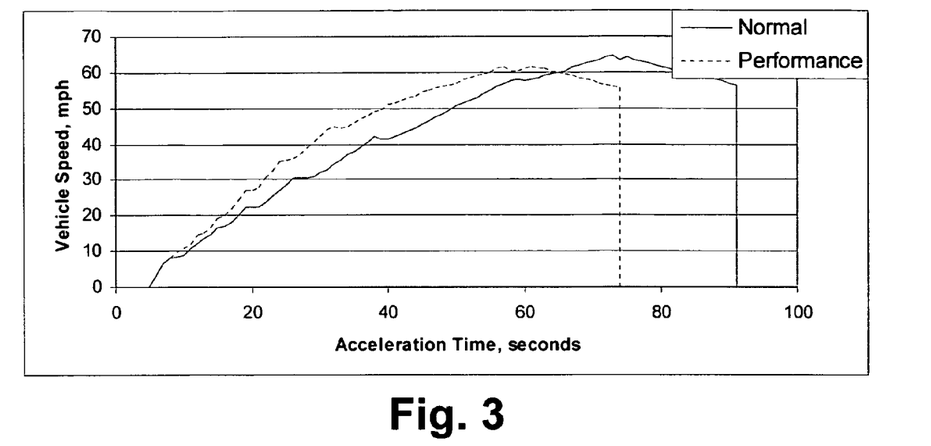
FIG. 3 is a plot of vehicle speed during truck acceleration for two transmission control strategies.
Figure 4:
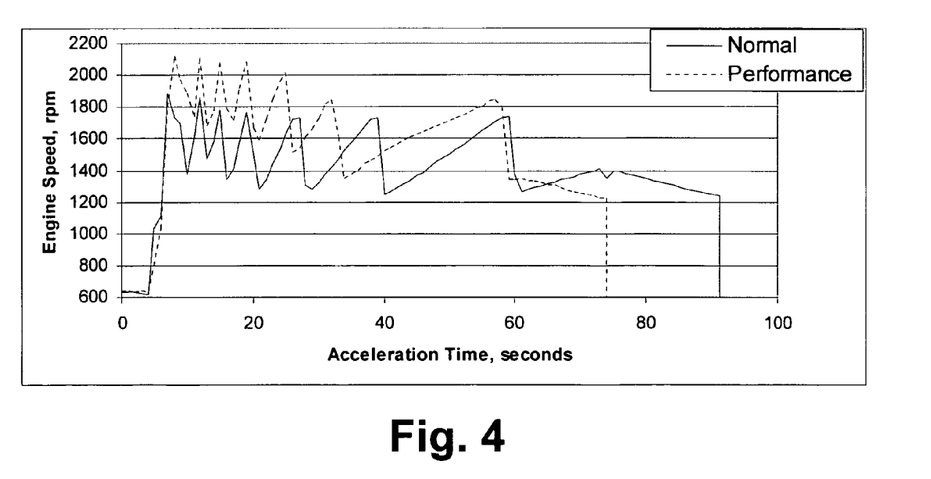
FIG. 4 is a plot the of engine speed showing the locations of gear shifts during the accelerations of FIG. 3.
Figure 5:
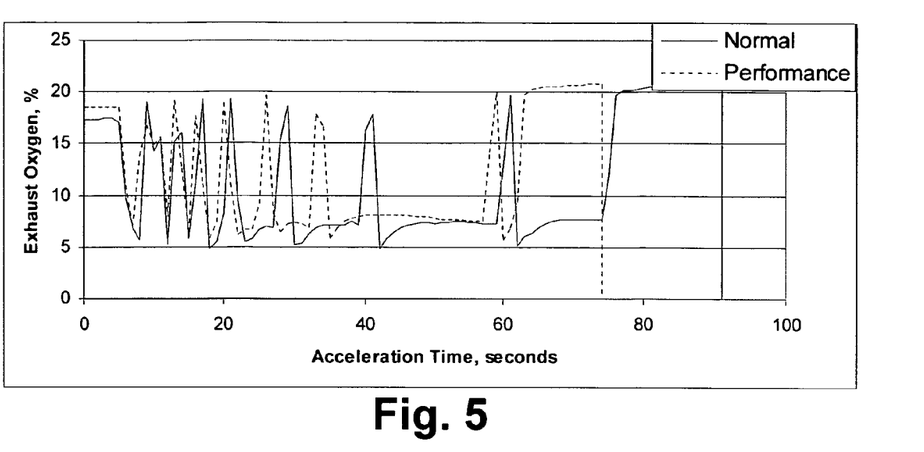
FIG. 5 is a plot the variations in exhaust oxygen concentration during the accelerations of FIG. 3.
Figure 6:
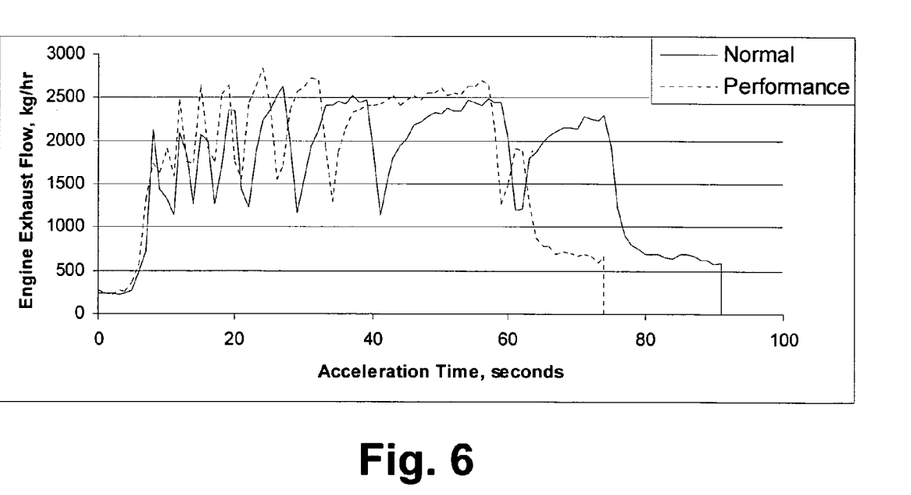
FIG. 6 is a plot of the exhaust flow rate during the accelerations of FIG. 3.

FIG. 2 is a finite state machine diagram 30 illustrating the operation of a controller implementing a method according to one of the inventor's concepts. The controller is for a denitration process, although the controller could alternatively, or in addition, control a desulfation process in the same general way. The controller begins in state 31. If while in state 31 the loading of the NOx adsorber 12 reaches a critically high level, for example, a level where the performance of the NOx adsorber 12 is below a minimum acceptable limit, the controller advances to a critical denitration state 32. If while in the state 31, favorable conditions for denitration occur, the controller selectively advances to the opportunistic regeneration state 33.

In the critical denitration state 32, the NOx adsorber 12 is at least partially regenerated. If the state 32 is programmed for partial denitration, the controller completes the partial denitration and then advances to the state opportunistic regeneration state 33, where regeneration continues if conditions are favorable. On the other hand, the state 32 may be programmed for full denitration, in which case the controller would return to the state 30 once dentiration was complete.

In the opportunistic denitration state 33, at least a partial denitration is carried out. Optionally, a full denitration is carried out, in the sense that denitration is carried out to some endpoint fixed independent of driving conditions. An endpoint may be fixed in any suitable manner. Example of manners of fixing an endpoint include detecting breakthrough of ammonia or a critical concentration of ammonia, detecting breakthrough of a reductant, or calculating that a certain amount of NOx has been removed from the NOx adsorber 12 or that the amount of NOx stored in the adsorber 12 has reduced to a particular level. On the other hand, the denitration state 33 may continually analyze the driving conditions and/or the NOx adsorber state and continue regeneration only as long as conditions for regeneration are favorable, e.g., in the sense that the fuel penalty for the next incremental amount of regeneration is likely to be low.

In the present application, the statement that a regeneration is initiated "selectively" based on a particular criteria requires that regeneration is sometimes initiated based on the stated criteria being met, but allows that regeneration can also be initiated based on criteria independent of the stated criteria being met. In the example of FIG. 2, at least one criteria relates to the transition from the normal operating state 31 to the opportunistic denitration state 33, whereas an independent criteria would govern the transition to the critical denitration state 32. The term "based" allows consideration of criteria in addition to the stated criteria. For example, a minimum temperature for the NOx adsorber 12 may be a requirement in addition to a stated requirement for a transition to the opportunistic regeneration state 33. In the case of desulfation, additional criteria could be, for example, that the vehicle is outside a population center or is moving at a critical speed where any $H_2S$ emissions are unlikely to be noticed.

One of the inventor's concepts is to initiate a full or partial regeneration based selectively on a calculated fuel penalty. The regeneration can be a denitration or a desulfation. A fuel penalty is a number relating an amount of NOx or SOx reduced to an amount of fuel expended. Preferably, a fuel penalty calculation provides a function that gives the fuel penalty as varying function relating amount of NOx or SOx reduced to amount of fuel expended. This function can be examined to determine whether a good opportunity to regenerate exists.

For example, in view of start-up fuel penalties, very brief (low extent) regenerations will generally have a high fuel penalty. On the other hand, fuel penalty becomes large for over-long regenerations due to progressively increasing reductant slip. A minimum in the fuel penalty will generally occur between these two extremes. Give this variation in the fuel penalty with extent of regeneration, a fuel penalty function is preferably calculated and a regeneration is preferably begun if there is any range of regeneration extents for which the fuel penalty is below a target level. Where a fuel penalty function is not calculated, the fuel penalty can be calculated based on a fixed amount of NOx or SOx reduction.

A target fuel penalty can be, for example, a fixed number or a number that varies with the extent of trap filling. A fixed number can be, for example, 50% of the average fuel penalty calculated based on driving experience without opportunistic regeneration. A variable number can be a number that increased monotonically with the extent of NOx or SOx loading. A target fuel penalty, or the parameters of a target fuel penalty formula, can be adapted based on driving experience to maximize fuel penalty reduction.

NOx loading is generally a calculated value. For example, NOx production rate can be estimated from data available to the ECU or from an exhaust NOx sensor and the fraction of this NOx stored in the trap can be determined from a trap model. The calculated value is preferably corrected from time-to-time by data. For example, the detection of a certain level of reductant slip during regeneration can be taken as an indicator that the NOx adsorber has reached a zero or other minimum NOx loading level. The level of SOx loading can likewise be estimated from ECU data. The SOx loading level can also be estimated by the NOx adsorber's efficiency measured immediately following a full regeneration: the NOx adsorption efficiency goes down with increasing SOx loading. This estimate can be corrected to account for irreversible NOx adsorber deterioration by assuming the NOx adsorber has reached a zero SOx loading level following a full desulfation or following a partial desulfation after which no improvement in NOx adsorption is realized. The efficiency of the NOx adsorber can be estimated with the aid of a downstream NOx sensor.

The components of a fuel penalty typically vary from system to system and the method of calculating the fuel penalty can vary according, the fuel penalty generally has several components. Typical components include a start-up penalty, a penalty for consuming excess oxygen, a penalty for fuel consumed by reducing reactions with NOx or SOx, and a fuel penalty associated with reductant slip.

A start-up fuel penalty is a fuel penalty that must be incurred before any reduction is achieved. A start-up fuel penalty may be associated, for example, with warming a fuel reformer or removing oxygen stored in a NOx adsorber.

A typical fuel reformer, such as a catalyzed partial oxidation reformer, is generally not effective for producing reformate below a certain temperature, e.g., below about 600° C. In the exemplary exhaust treatment system 10, the fuel reformer 11 generally drops to near the temperature of the exhaust between regeneration cycles. Typical diesel exhaust temperatures are in the range from about 250° C. to about 480° C. To heat the reformer, a small amount of reductant is supplied to the reformer and burned there in an excess of oxygen. Typically, there is ample oxygen in the exhaust for this process. If heat loss to the exhaust and to the surroundings can be neglected, the amount of fuel required can be calculated from the thermal mass of the reformer, the starting reformer temperature, the required reformer temperature, and the amount of chemical energy contained in the fuel.

In this case, the reformer start-up fuel penalty depends primarily on the initial reformer temperature, and is mostly independent of the exhaust composition and flow rate. On the other hand, if heat loss to the exhaust is significant and there is a limit to how rapidly the reformer can be heated, than the reformer start-up fuel penalty can also show a significant dependence on exhaust temperature and exhaust flow rate. A reformer start-up fuel penalty is avoided altogether if a reformer is not used or if the reformer is constantly at an operative temperature.

With regard to a start-up penalty for removing stored oxygen, a NOx adsorber can be modeled as a NOx store and an oxygen store. The oxygen storage will generally reach saturation quickly under lean conditions. This oxygen must generally be removed before reduction of NOx can begin. If fuel were introduced directly to the NOx adsorber, assuming a 1.85 ratio between carbon and hydrogen in diesel fuel, and assuming no fuel slip while there is stored oxygen in the LNT, the fuel penalty can be calculated from the number of moles of oxygen stored in the NOx adsorber and the following reaction stoichiometry:

$$CH_{1.85} + 1.46 O_2 \rightarrow CO_2 + 0.93 H_2O \qquad (1)$$

From this equation, the fuel penalty is 9.5 grams fuel per mole stored oxygen.

On the other hand, if the fuel is first converted to reformate, the fuel penalty is higher. Assuming 100% conversion of fuel to CO and $H_2$ during reforming, the stoichiometry for fuel reformation is $$CH_{1.85} + 0.5 O_{2,exhaust} \rightarrow CO + 0.93 H_2 \qquad (2)$$

The stoichiometry for oxygen consumption by reformate is:

$$(CO + 0.93 H_2) + 0.96 O_{2,stored} \rightarrow CO_2 + 0.93 H_2O \qquad (3)$$

From these equations, the fuel penalty is 14.4 grams fuel per mole stored oxygen. This start-up fuel penalty can be reduced by reducing the oxygen storage capacity of the NOx adsorber.

A penalty for consuming excess oxygen arises from the need to conduct regeneration in a reducing atmosphere. The oxygen consumption fuel penalty depends greatly on the system configuration and operation. For example, if the exhaust treatment system 10 is operated to provide fuel to the reformer 11 according to the stoichiometry of equation (2), then there may be no fuel penalty associated with removing excess oxygen. Oxygen can be efficiently consumed producing reformate. If this ideal is realized, the fuel penalty only varies with exhaust flow rate and oxygen concentration to the extent these factors affect such things as the start-up fuel penalty and the reductant slip fuel penalty.

On the other hand, if the reformate is formed outside the exhaust stream and injected into the exhaust, the oxygen consumption fuel penalty may follow the stoichiometry of Equation (3), with exhaust oxygen substituted for stored oxygen. In this case the oxygen consumption fuel penalty may be quite substantial and may be in proportion to both the exhaust flow rate and the exhaust oxygen concentration. In this case, the oxygen consumption fuel penalty varies with reductant injection rate. While the oxygen consumption fuel penalty may decrease with reductant injection rate, the reductant slip fuel penalty may increase with reductant injection rate; therefore there will generally be an optimal reductant injection rate. Where appropriate, a fuel penalty calculation preferably includes a subsidiary calculation of the optimal reductant injection rate and the fuel penalty is preferably calculated based on the optimum achievable reductant injection rate.

The fuel penalty for reactions involved in reducing adsorbed NOx is dependant on the relative proportions of the reduction productions, which include $N_2O$, $NH_3$, and $N_2$ and on the stoichiometry of their reduction reactions. Desorbed $NO_2$ and NO may also be produced as a result of reduction, however, it is believed that the initial peak in these products' production often seen at the beginning of a regeneration is related to the oxygen storage capacity of the NOx trap and the cost of reduction of stored NOx resulting in these products may be considered part of the start-up fuel penalty. In any case, the amount of fuel consumed desorbing NO and NOx is believed to be generally small enough to be neglected.

The ratios between $N_2$ and $N_2O$ and $NH_3$ production are selectivities of the reduction process. These selectivities show a strong dependence on extent of NOx adsorption. Additional variables include the catalyst formulation, the temperature, and the reductant concentration. A highly accurate determination would require modeling the variations of these parameters along the length of the NOx adsorber including experimental studies to determine the model parameters. A useful fuel penalty calculation does not require this much accuracy. The selectivities can be determined experimentally and fit to a small number of parameters. In one embodiment, the selectivities are modeled as a function depending only on the amount of NOx stored in the adsorbant. Fixed selectivities may also be assumed, although assuming fixed selectivities means the magnitude of the selectivities will generally not affect a control strategy based on fuel penalty. Only the relative magnitudes of fuel penalties relate to control strategies and absolute values need not be determined.

For purposes of determining whether selectivity is an important enough variable to warrant the difficulty of including its dependence on conditions in a fuel penalty calculation, it may be considered that a typical selectivity between $N_2$, $N_2O$, and $NH_3$ production gives an average ratio typically in the neighborhood of about 6:2:2. The importance of these numbers depends on system configuration and design choices such as whether the system includes a downstream SCR catalyst, whether the system include a clean-up oxidation catalyst, and whether reduction to $N_2O$ is considered useful. For example, $N_2O$ is not currently controlled by US regulations and the fuel penalty may accordingly be calculated as grams fuel per gram adsorbed NOx reduced to either $N_2$ or $N_2O$. On the other hand $N_2O$ may eventually be regulated or simply controlled because it is considered polluting, in which case the fuel penalty may be expressed as grams fuel per mole adsorbed NOx reduced to $N_2$ and the fuel penalty may show a strong dependence on conditions affecting selectivity between $N_2$ and $N_2O$.

The stoichiometries of $N_2$, $N_2O$, or $NH_3$ production depend on the NOx adsorbant. For example, if the adsorbant stores NOx as $M(NO_3)_2$ and reduction is by direct diesel injection, then the stoichiometry of $N_2$ production is:

$$M(NO_3)_2 + 1.71CH_{1.85} \rightarrow MO + N_2 + 1.71CO_2 + 1.58H_2 \quad (4)$$

whereby the reduction fuel penalty would be 11.8 grams per mol stored NOx if $N_2$ were the only reduction product. If the fuel is first reformed the stoichiometry is:

$$M(NO_3)_2 + 2.59(CO + 0.93H_2) \rightarrow MO + N_2 + 2.59CO_2 + 2.41H_2O \quad (5)$$

whereby (with Equation 2) the fuel penalty is 17.9 gm per mol stored NOx reduced to $N_2$. The other stoichiometries are:

$$M(NO_3)_2 + 2.07(CO + 0.93H_2) \rightarrow MO + N_2O + 2.07CO_2 + 1.93H_2O \quad (6)$$

$$M(NO_3)_2 + 4.16(CO + 0.93H_2) \rightarrow MO + 2NH_3 + 4.16CO_2 + 0.85H_2O \quad (7)$$

giving a fuel penalty of 14.3 gm per mol stored NOx reduced to $N_2O$ and a fuel penalty of 28.8 gm per mol stored NOx reduced to $NH_3$. If the exhaust treatment system includes an SCR catalyst 12 to utilize ammonia, then it may be consider that one mole NOx is reduced generating a mole of ammonia and another mole of NOx is reduced by the mole of ammonia so produced. Since reducing a mole of gaseous NOx is at least as useful as reducing a mole of stored NOx, Equation (7) may than be used to determine that the fuel penalty is 14.4 grams per mol stored NOx reduced via ammonia, assuming 100% efficiency in the use of stored ammonia.

Since the stored NOx reduction fuel penalty associated with the ammonia route (14.4 g/mol) is only slightly less than the direct route fuel penalty (17.9 g/mol), and the difference is further reduced by the actual efficiency of ammonia usage (generally high, but less than 100%) selectivity between NOx and $NH_3$ can be ignored in the fuel penalty calculation when a downstream SCR is in use. On the other hand, the foregoing calculations shows that ammonia production is wasteful of fuel if an SCR catalyst is not in use and that ammonia production is preferably avoided for fuel penalty reasons, even if ammonia production is not otherwise avoided because of its effect on the environment, which can be addressed by a clean-up oxidation catalyst in an appropriately configured system.

An additional contribution to the fuel penalty is reductant slip. This penalty can be expressed in terms of an efficiency factor. If all of the reductant entering the NOx adsorber after the start-up penalty phase is consumed by reducing reactions and there is no reductant slip, the efficiency factor is one. At lower temperatures and higher flow rates, the efficiency factor can be significantly less than one. In such circumstances, the efficiency factor decreases with increasing flow rate whereby reductant slip is proportional to the flow rate. If the kinetics of reduction are essentially first order, as is generally the case at low reductant concentrations, the efficiency factor is independent of reactant concentration: higher reactant concentration leads to a greater rate of reductant slip, but also to a proportionally greater rate of NOx reduction. Langmuir-Hinshelwood kinetics might be observed for reduction. In this case, the efficiency factor decreases with increasing reductant concentrations as reaction kinetics slow due to reactants or products blocking active surface sites.

Combining these factors, an exemplary formula for calculating a fuel penalty for denitration is:

$$P_{all}(y) = P_{start} + yR_{O2}R_{slip}\frac{x_{N_2O}\delta_{N_2O} + x_{NH_3}\delta_{NH_3} + x_{N_2}\delta_{N_2}}{x_{N_2}} \quad (8)$$

where $P_{all}(y)$ is the overall fuel penalty (in grams, for example) as a function of y, the number of moles of adsorbed $NO_x$ reduced to $N_2$, $P_{start}$ is the fuel penalty for initiating reduction, $R_{O2}$ is the ratio between moles of fuel expended consuming excess oxygen in the exhaust and moles of fuel left available for reducing NOx, $R_{slip}$ is the ratio between reductant passing through the NOx adsorber unconverted and moles consumed within the NOx adsorber by NOx reducing reactions, $x_{N2O}$, $x_{NH3}$, and $x_{N2}$ are the fractions of NOx reduced respectively to $N_2O$, $NH_3$, and $N_2$, and $\delta_{N2O}$, $\delta_{NH3}$, and $\delta_{N2}$ are the amounts of fuel (gram) required to reduce a mole of adsorbed NOx to, respectively, $N_2O$, $NH_3$, and $N_2$.

A fuel penalty formula such as Equation (8) shows that predicting suitable conditions for regeneration based on a priori reasoning can, in some cases, lead to wrong choices. For example, observing that flow rates are low during decelerations might lead a designer to opt for a control system that selectively initiates regenerations based on a deceleration occurring, however, the factor $P_{start}$ would militate against this if the extent of NOx adsorption is insufficient, and the factor $R_{O2}$ would militate against this if, as is typical, the oxygen concentration is high during deceleration and $R_{O2}$ has a strong dependence on oxygen concentration. Accordingly, one concept of the invention is to use a fuel penalty calculation in place of a priori reasoning to opportunistically regenerate a NOx trap.

Another concept of the invention is to use an SCR catalyst in conjunction with a control system that provides for opportunistic denitrations. Equation (8) shows the importance of being able to carry out extended partial denitrations in order for opportunistic denitrations to be effective in reducing fuel penalty. A partial denitration must be extended for an incremental fuel penalty benefit (low fuel cost after start-up per unit NOx reduced) to offset the increased start-up penalty associated with partial denitrations. In the absence of an SCR catalyst, ammonia production can prevent an extended partial denitration in that, as shown by the preceding calculations, ammonia production in the absence of SCR has a strong negative effect on fuel penalty. The onset of ammonia production would offset the sought after fuel penalty savings, even if a clean-up catalyst otherwise made the ammonia tolerable. An SCR catalyst is therefore highly conducive to opportunistic partial denitration in that it allows the denitration to be extended well into the regime of ammonia production, and by so doing allows the advantage of low incremental fuel penalty under current conditions to be realized in spite of a start-up fuel penalty $P_{start}$.

A further concept of the invention arises out of the calculations for the term $R_{O2}$ respecting an inline reformer. These calculations show that a very large fraction of the fuel is generally used to consume excess oxygen, but this fraction approaches zero when the fuel reforms stoichiometrically with oxygen according to Equation (2). While reactions with $H_2O$ and $CO_2$ in the exhaust are possible, the inventor has conceived that the stoichiometry can be calculated based on oxygen alone. Defining a stoichiometric amount of 1.0 as the maximum amount that could be converted entirely to $H_2$ and CO by the $O_2$ in the exhaust, according to one embodiment of this concept, the amount of fuel injected after preheating the reformer and transitioning to rich conditions, is from about 0.80 to about 1.3 times the stoichiometric amount over at least the majority of the rich period, preferably over at least about 70% of the rich period. More preferably, the fuel is injected at a rate providing from about 0.9 to about 1.15 times the stoichiometric amount. Given a stoichiometric amount of fuel having a carbon to hydrogen atomic ratio of 1:1.85 in a 5% oxygen exhaust, the CO concentration can approach 10% while the $H_2$ concentration approaches 9%. A suitable reformer for obtaining near stoichiometric conversions of this type after preheating to 650° C. is the Xonon® fuel processor (XFP) commercially available from Catalytica Energy Systems, Inc. Near stoichiometric conversions are generally easier to achieve and temperature is easier to control at lower oxygen concentrations.

FIGS. 3 to 6 plot vehicle speed, engine speed, exhaust flow rate, and exhaust oxygen concentration for a throttled diesel engine as the engine accelerates a vehicle. The results for two shifting strategies are plotted. The solid lines are for a conventional shift strategy and the broken lines are for a performance shift strategy. In either case, a substantial dip in both oxygen concentration and flow rate is seen during shift operations. In view of this data and consideration of fuel penalty such as described above, the inventor has identified that gear shifts provide opportunities for low fuel penalty denitration and would be so acted upon by an appropriate fuel penalty-based opportunistic controller.

One understanding of the low oxygen concentrations between gears is as follows: During acceleration, the exhaust temperature rises and the oxygen concentration drops. When the engine shifts out of gear, the flow rate immediately drops, but for a period the exhaust oxygen concentration remains at the level characteristic of acceleration. In any event, the low oxygen concentrations and low exhaust flow rates provide conditions conducive to low fuel penalty partial denitrations. An inline reformer is also generally relatively warm under these conditions, reducing the fuel penalty associated with staring the reformer. The low flow rate contributes to low reductant slip, and the low oxygen concentration contributes to efficient production of reformate. Low flow rate and low oxygen concentration are even more significant when the oxygen is consumed by other mechanisms than fuel reformation. Conditions are generally favorable even if the engine is not throttled. Accordingly, one of the inventor's concepts is to opportunistically initiate regenerations during gear shifts, whereby regeneration is facilitated by conditions existing while the transmission is between gears.

A related concept applies to the case of a throttled diesel engine. The concept is to opportunistically initiate regenerations selectively based on the degree of engine throttle. The throttling is based on driving conditions, whereby vehicle performance is not routinely affected by the operation of the vehicle's exhaust treatment system. When the engine is throttled, both the oxygen concentration and the exhaust flow rate generally decrease. Low oxygen concentration and low exhaust flow rate will lead to lower fuel penalty when such factors as reductant slip and excess oxygen consumption fuel penalty are significant. The regeneration is initiated selectively, meaning other criteria may be checked before initiating a regeneration. Examples of other criteria that could be checked include whether a minimum estimated amount of NOx is in the NOx adsorber, whether NOx break-through rate is above a minimum, whether a minimum time has passed since the last regeneration, and whether a reformer is at or above a minimum temperature.

Desulfation requires an elevated NOx adsorber temperature over an extended period of time. On the other hand, a typical NOx adsorber will be damaged by excessively high temperatures. A typical NOx adsorber target desulfation temperature is in the range from about 600 to about 700° C. For the system 10, to maintain this temperature range and a reducing atmosphere within the NOx adsorber 12, it may prove most efficient to cycle the reformer 11 between rich operation and a no-fuel lean operation during which the NOx adsorber 12 is allowed to cool. Accordingly, a typical fuel penalty for desulfation is:

$$P_{des}(z) = (P_{S,start} - P_{restart}) + \sum_{i=1}^{N}\left(P_{restart} + \frac{z}{N}R_{O2}R_{S,slip}\delta_{SO_x}\right) \quad (9)$$

where $P_{des}(z)$ is the overall fuel penalty (in grams, for example) as a function of z, the number of moles of adsorbed $SO_x$ reduced, $P_{S,start}$ is the fuel penalty for starting the reformer and heating the NOx adsorber to a desulfation temperature, $P_{restart}$ is the fuel penalty for reinitiating desulfation after a pause to allow the NOx adsorber to cool, $R_{S,slip}$ is the ratio between reductant passing through the NOx adsorber unconverted and moles consumed within the NOx adsorber by SOx reducing reactions, $\delta_{SOx}$ is the amounts of fuel (gram) required to reduce a mole of adsorbed SOx, and N is the number of cycles.

$P_{restart}$ is not expected to vary greatly, since the amount of cooling between reducing phases is generally part of the control strategy. Where the reformer does not have to be restarted for temperature control, N equals one and $P_{restart}$ drops out of Equation (9).

In contrast to $R_{slip}$, $R_{S,slip}$ is expected to always be a large factor. Most of the reductant is expected to slip during desulfation. Accordingly, the fuel penalty term apart from the start-up penalties is generally proportional to the exhaust flow rate. A significant unknown is whether $R_{slip}$ is a strong function of reductant concentration. More particularly, it is unknown whether the desulfation rate is proportional to the reductant concentration even within the low reductant concentration regime (the regime where Langmuir-Hinshelwood kinetics would not be apparent for denitration). This, however, can be determined experimentally. It is suspected that the kinetics will appear zero order in reductant concentration, with the rate limiting step being a solid phase disassociation reaction that results in desulfation provided that the atmosphere is reducing. If this proves the case, then the product $R_{O2}R_{S,slip}$ will reflect that the fuel penalty is proportional to the oxygen flow rate (the product of the exhaust oxygen concentration and the exhaust flow rate).

Equation (9) provides the basis for a control strategy in which desulfation is carried out in many small opportunistically selected increments. Suitable conditions for opportunistic desulfation may include, for example, conditions where the oxygen flow rate will be low over an extended period and conditions where the oxygen flow rate is currently low and the $P_{S,start}$ is also currently low. Examples of conditions that may be suitable for partial desulfations include conditions associate with downhill driving, uphill driving, and traffic stops, suitability depending, among other things, on whether the air supply is throttled.

Because denitrations can be very short, Equation (8) can generally be evaluated based on current conditions, although a prediction of future condition would not be inappropriate. On the other hand, it is much more uncertain whether Equation (9) will provide useful estimates of fuel penalty if it is evaluated on the basis of current conditions. Accordingly, the inventor has conceived of opportunistically initiating regeneration, especially desulfations, based on predicted future conditions.

One method of predicting future conditions uses GPS and map data. Knowing which direction the vehicle is going, this information can be used to predict approaching conditions such as uphill driving, downhill driving, and traffic stops. Moreover, a prediction can be made as to how long each of these conditions will last. This information can be used for example, in conjunction with an equation such as Equation (9), to determine whether an opportunity exists to regenerate a NOx adsorber at a comparatively low fuel penalty.

Driving conditions refer to all vehicle conditions occurring independently of an exhaust treatment system and include, without limitation, road conditions, driver commands, transmission state, engine operating parameters, and engine-out exhaust conditions. Examples of driving conditions include whether the vehicle is traveling, uphill, downhill, or on level ground, whether the vehicle is accelerating, decelerating, or at constant speed, whether the vehicle is idling, whether the vehicle is in city traffic or on a highway, whether the transmission gear is being shifted, exhaust temperature, exhaust flow rate, and engine-out exhaust oxygen concentration.

Where regeneration is initiated based on a fuel penalty calculation, it is preferred that regeneration be continued or terminated based on a revised fuel penalty calculation. If conditions change after a regeneration has started, it may be desirable to terminate the regeneration sooner than originally planned. In making a determination whether to terminate a regeneration based on changed circumstances, an equation such as Equation (8) or (9) can be applied, but without the start-up fuel penalty. Eliminating the start-up fuel penalty favors continuing a regeneration once started; a regeneration may continue under conditions that would not be sufficiently favorable to warrant initiating a partial regeneration, however if circumstances change to a greater extent it may not be worthwhile to finish a partial regeneration already in progress.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, embodiment, or example described herein.

The invention claimed is:

1. An exhaust treatment system, comprising:
a NOx adsorber-catalyst configured to treat an exhaust flow;
an SCR catalyst configured to adsorb ammonia released by the NOx adsorber-catalyst during denitration and to subsequently use the ammonia to reduce NOx in the exhaust; and
a controller configured to control a supply of reductant for denitrating the NOx adsorber-catalyst;
wherein the controller is configured to initiate partial denitrations of the NOx adsorber-catalyst selectively based on at least one of current and future driving conditions.

2. The system of claim 1, wherein the system is configured to treat an exhaust flow from a compression ignition diesel engine.

3. The exhaust treatment system of claim 1, further comprising a fuel reformer configured in line with the exhaust flow upstream of the NOx adsorber catalyst.

4. The exhaust treatment system of claim 3, wherein the controller is configured to supply the reductant at a rate that provides from about 0.80 to about 1.3 times of a stoichiometric amount with respect to the oxygen concentration in the exhaust over at least the majority of a rich period of a denitration cycle, a rich period being the period where a reducing environment is created within the NOx adsorber-catalyst to bring about a partial denitration.

5. A method of operating a NOx adsorber, comprising:
configuring the NOx adsorber to receive an oxygen-containing exhaust from a compression ignition diesel engine;
calculating a fuel penalty or fuel penalty rate associated with incremental, partial, or full denitration or desulfation of the NOx adsorber under current and/or predicted conditions;
initiating a denitration or desulfation process based selectively on whether the calculated fuel penalty or fuel penalty rate is sufficiently low; and
continuing the denitration or desulfation process to effectuate at least a partial regeneration of the NOx adsorber;
wherein the fuel penalty or fuel penalty rate calculation includes a calculation of fuel expended as a varying function of amount of NOx or SOx to be removed from the NOx adsorber.

6. A method of operating a NOx adsorber, comprising:
configuring the NOx adsorber to receive an oxygen-containing exhaust from a compression ignition diesel engine;
calculating a fuel penalty or fuel penalty rate associated with incremental, partial, or full denitration or desulfation of the NOx adsorber under current and/or predicted conditions;
initiating a denitration or desulfation process based selectively on whether the calculated fuel penalty or fuel penalty rate is sufficiently low; and
continuing the denitration or desulfation process to effectuate at least a partial regeneration of the NOx adsorber;
wherein the fuel penalty is associated with denitration;
the denitration process involves warming a fuel reformer, reforming diesel fuel within the reformer, and supplying the reformed fuel to the NOx adsorber; and
the fuel penalty includes a first contribution associated with warming the reformer and a second contribution associated with producing reformate after the reformer is warmed.

7. A method of operating a NOx adsorber, comprising:
configuring the NOx adsorber to receive an oxygen-containing exhaust from a compression ignition diesel engine;
calculating a fuel penalty or fuel penalty rate associated with incremental, partial, or full denitration or desulfation of the NOx adsorber under current and/or predicted conditions;
initiating a denitration or desulfation process based selectively on whether the calculated fuel penalty or fuel penalty rate is sufficiently low; and continuing the denitration or desulfation process to effectuate at least a partial regeneration of the NOx adsorber
further comprising configuring an ammonia-SCR catalyst downstream of the NOx adsorber;
wherein the fuel penalty or fuel penalty rate calculation takes into account ammonia production and subsequent reduction of NOx by the ammonia.

8. A method of operating a NOx adsorber, comprising:
configuring the NOx adsorber to receive an oxygen-containing exhaust from a compression ignition diesel engine;
measuring or calculating an oxygen concentration for the exhaust; and
initiating partial or full denitrations or desulfations of the NOx adsorber based selectively on whether the oxygen concentration is no greater than or will shortly fall to or below a critical concentration.

9. The method of claim 8, wherein the initiated process is denitration.

10. The method of claim 8, further comprising configuring an ammonia-SCR catalyst downstream of the NOx adsorber.

11. The method of claim 8, wherein initiating partial or full denitrations or desulfations comprises initiating the production of reformate.

12. The method of claim 11, wherein the reformate is produced in the exhaust.

13. A method of operating a NOx adsorber, comprising:
configuring the NOx adsorber to receive an oxygen-containing exhaust from a compression ignition diesel engine;
initiating at least a partial denitration of the NOx adsorber based selectively on driving conditions;
wherein one of the driving conditions that can cause denitration to begin is, or is an effect of, a transmission gear shift and the denitration is facilitated by conditions existing while the transmission is between gears.

14. The method of claim 13, further comprising configuring an ammonia-SCR catalyst downstream of the NOx adsorber.

15. A method of operating a NOx adsorber, comprising:
configuring the NOx adsorber to receive an oxygen-containing exhaust from a compression ignition diesel engine configured for EGR and having a throttled air supply;
selectively initiating partial or full denitration or desulfation operations based in part on the air supply throttling being elevated;
wherein the air supply throttling is elevated in response to driving conditions.

16. The method of claim 15, wherein the selectively initiated process is a partial or full denitration.

17. The method of claim 15, further comprising configuring an ammonia-SCR catalyst downstream of the NOx adsorber.

18. A method of operating a NOx adsorber, comprising:
configuring the NOx adsorber to receive an oxygen-containing exhaust from a compression ignition diesel engine;
selectively initiating partial or full denitration operations based on driving conditions according to a strategy that results in partial or full denitration operations being initiated in response to gear changes;
whereby regeneration is facilitated by conditions existing while the transmission is between gears;
wherein initiating partial or full denitrations comprises injecting fuel into lean exhaust to make a rich composition.

19. The method of claim 18, wherein the engine has a throttled air supply.

20. The method of claim 18, wherein the strategy uses information regarding transmission gear.

* * * * *